United States Patent [19]

Mund

[11] 3,943,005

[45] Mar. 9, 1976

[54] PROCESS FOR THE MANUFACTURE OF AN ELECTRODE MATERIAL CONTAINING SILVER AND TUNGSTEN CARBIDE

[75] Inventor: Konrad Mund, Erlangen-Sieglitzhof, Germany

[73] Assignee: Siemens Aktiengesellschaft, Munich, Germany

[22] Filed: Sept. 6, 1973

[21] Appl. No.: 394,866

[30] Foreign Application Priority Data

Sept. 12, 1972 Germany.................... 2244702

[52] U.S. Cl........... 136/120 FC; 75/.5 AC; 423/439
[51] Int. Cl.²......................................... H01M 4/86
[58] Field of Search... 75/.5 AC; 136/86 D, 120 FC; 423/439, 440

[56] References Cited
UNITED STATES PATENTS 3,684,579    8/1972    Mund et al. ................. 136/120 FC Primary Examiner—G. L. Kaplan
Assistant Examiner—H. A. Feeley
Attorney, Agent, or Firm—Kenyon & Kenyon Reilly Carr & Chapin

[57] ABSTRACT

The invention concerns a method for the manufacture of an electrode material containing silver and tungsten carbide for electrochemical cells, particularly fuel cells and storage cells. Tungsten carbide in powder form is placed in a solution of a tungstate; then silver tungstate is precipitated by adding thereto a silver salt and the silver tungstate in the tungsten carbide-silver tungstate mixture is reduced to silver and tungsten, and subsequently the tungsten is carburized to form tungsten carbide. This abstract is neither intended to define the invention covered by this application, which, of course, is measured by the claims, nor is it intended to be limiting as to the scope of the invention in any way.

8 Claims, 1 Drawing Figure

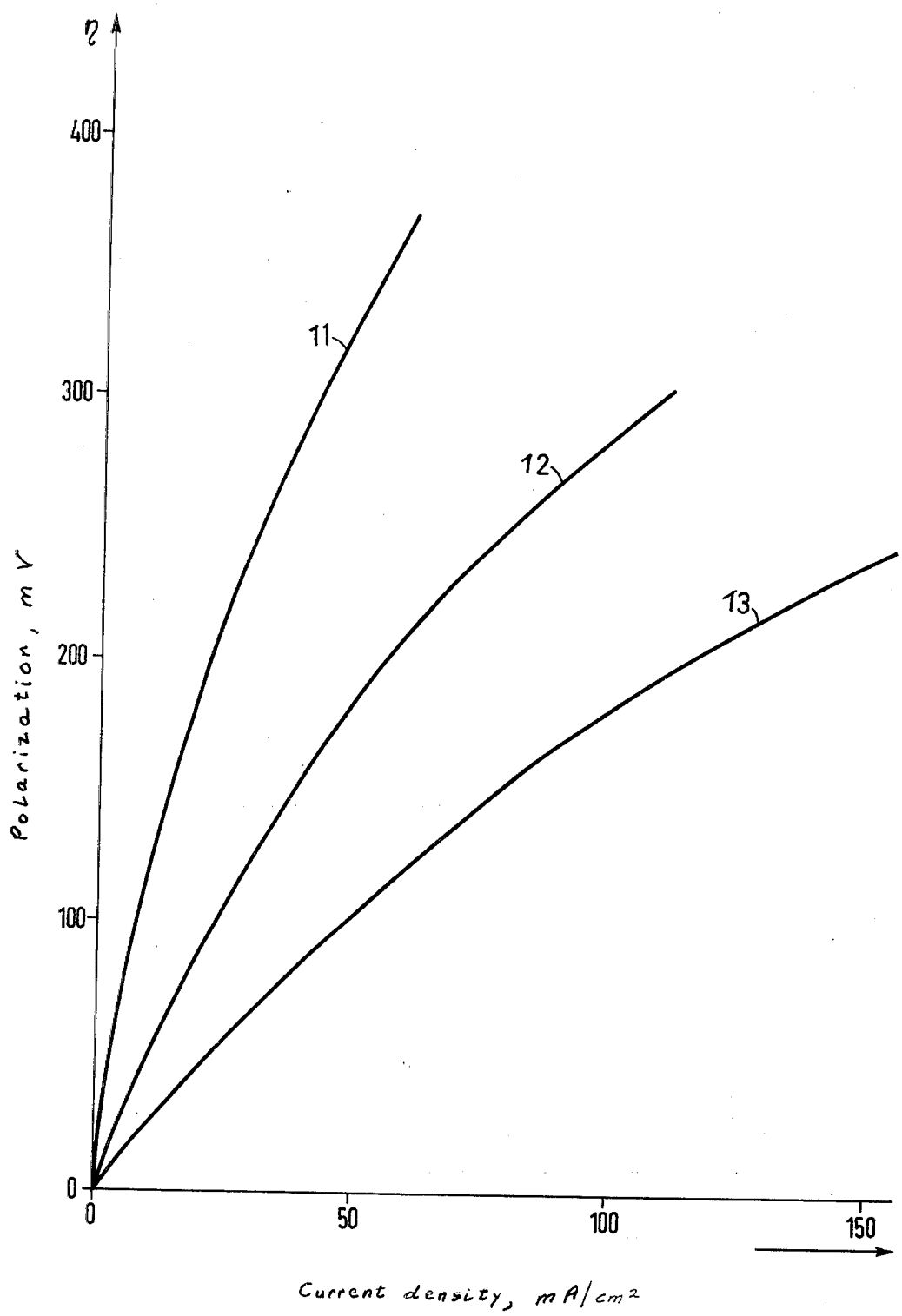

PROCESS FOR THE MANUFACTURE OF AN ELECTRODE MATERIAL CONTAINING SILVER AND TUNGSTEN CARBIDE

The invention relates to a method for the manufacture of an electrode material containing silver and tungsten carbide for electrochemical cells, particularly fuel cells and storage cells, by means of reduction of a silver tungstate and a subsequent carburization.

It is known to employ tungsten carbide as a catalyst for the anodic oxidation of fuels, for instance, hydrogen, in fuel cells with an acidic electrolyte. Tungsten carbide may be made, for instance, by carburizing metallic tungsten with carbon, carbon black, or carbon-containing gases, such as carbon monoxide and methane, at temperatures above about 700°C. For the manufacture of bonded gas electrodes, tungsten carbide powder may be mixed with polymers as binders and pore-forming agents or with porous additives, such as activated carbon, and can be cold or hot molded (see "Energy Conversion", Vol. 10 pp. 25–28 (1970)).

Difficulties are encountered in the manufacture of unbonded electrodes which contain the electrode catalytic material in powder form. In the preparation of tungsten carbide from tungstic acid by reduction with hydrogen and carburation with carbon monoxide, for instance, the tungsten carbide thereby obtained has a mean particle size of less than about 1 micron; particles of larger diameter have too little surface area for electrode purposes in electrochemical cells. Employing particles of small diameter in powder electrodes leads to various difficulties. For one, the application of electrical contacts is a problem, as a conducting screen or fabric which is gas-permeable cannot be made economically and furthermore has pores so fine that the catalyst particles cannot get through the fabric into the gas chamber. On the other hand, the diameter of the pores (interstices) which form between the particles, depends on the size of the particles. Narrow pores between small particles develop high capillary pressures if they are filled with liquid, and the presence of a three-phase boundary can be created only by the use of very high gas pressures.

These difficulties are not present in bonded electrodes, because during the manufacture of such electrodes transport pores can be produced, by the introduction of pore-forming agents according to known methods, which are filled with gas even at low gas pressures and thereby readily permit the transport of the reaction gas to the point of the reaction. The use of organic binders, however, can have a detrimental effect, particularly in high-performance electrodes, since the binders have insulating properties and thereby impede the conduction of the current, and exclude a portion of the particles entirely from the conduction of the current, and hence from participation in the electrochemical process.

German Offenlegungsschrift No. 1,939,127 describes a method for the manufacture of an electrode containing tungsten carbide for fuel cells in which the fine tungsten carbide particles are held together by silver, so that particles with a larger diameter are produced. For preparing the catalyst material, the silver salt of a tungstic acid, preferably silver metatungstate, is reduced and carburized at elevated temperature, whereby silver-containing tungsten carbide (Ag-WC) particles are formed. Such particles have a grain diameter approximately in the range of between about 10 and about 80 microns. The electrode material is distinguished by a high load capacity due to its advantageous structure; in addition to the diameter of the particles, which is well-suited for use in powder electrodes, the electrode material has a sufficiently large surface area, approximately in the range of 5 $m^2/g$ (as determined by the BET method). In manufacturing larger quantities of electrode material, however, it is difficult to obtain uniform reproducibility which is particularly observable in the electrochemical properties of the product electrode.

It is an object of the invention to provide a further improved method for the manufacture of an electrode material containing silver and tungsten carbide for electrochemical cells, particularly fuel cells and storage cells, by the reduction of a silver tungstate and subsequent carburizing. In addition, an electrode material with greater activity is obtained, which, furthermore, has a reduced silver content.

Broadly stated, the process comprises forming a suspension of finely divided particles of tungsten carbide in an aqueous solution of a tungstate, adding to such suspension a solution of a silver salt, thereby forming a precipitate of silver tungstate, separating from the reaction mixture a mixture of tungsten carbide and precipitated silver tungstate, reducing the silver tungstate in such mixture to metallic silver and tungsten, and carburizing such metallic tungsten to tungsten carbide, thereby obtaining silver-containing tungsten carbide particles.

In a particularly preferred embodiment of the process, a suspension of tungsten carbide particles having a mean grain size of less than about 1 micron is suspended in an aqueous solution of an alkali metal tungstate, preferably sodium metatungstate ($Na_2O.4\ WO_3$). The amount of tungsten, considered as elemental tungsten, in the tungsten carbide particles is preferably equal to the tungsten in the tungstate solution. To such solution and while it is being vigorously agitated, an aqueous solution of silver nitrate is slowly added, preferably dropwise, thereby precipitating silver metatungstate which envelopes the existing tungsten carbide particles and joins them together to form particles of larger size, in the range of 10–80 microns. After the agitation is stopped, the supernatant liquid is decanted, and the precipitate dried. Then the silver metatungstate in such precipitate is reduced to metallic silver and tungsten in a flowing stream of hydrogen at a temperature in the range of about 400° to about 600°C, preferably about 540°C. Thereafter such metallic tungsten is carburized by treatment with flowing carbon monoxide at a temperature in the range of about 800° to 1000°C, preferably about 840°C, thus producing the silver-containing tungsten carbide particles having an average size in the range of 10 to about 80 microns. Further details of the process are explained in the following paragraphs.

The reduction step in which the silver tungstate contained in the mixture is reduced to metallic silver and tungsten is advantageously done with hydrogen at a temperature in the range of between about 400° and about 600°C, and preferably at about 540°C. The reduction may also be performed in two steps, in which the reduction is first performed in the above-mentioned temperature range, and thereafter proceeds in a temperature range between about 600° and 800°C, preferably at about 700°C.

The carburizing step, in which the tungsten of the now-existing silver, tungsten and tungsten carbide mixture is converted into tungsten carbide, is advantageously performed with a normally-gaseous, carbon-containing compound, particularly carbon monoxide or a low molecular weight hydrocarbon, such as methane, acetylene or benzene, at a temperature in the range of between about 800° and about 1000°C. Carbon, particularly in the form of carbon black, may also be employed. The carburizing step is preferably performed with carbon monoxide at between about 820° and 840°C.

In order to improve the electro-catalytic properties of the product electrode material, the reducing and carburizing steps may also be repeated at the same conditions employed in the initial reducing and carburizing steps.

Metatungstates are preferred in the process because they have the advantage that only a small amount of silver is involved, since the silver tungstate formed in the course of the process is the tungstate with the lowest weight percentage of silver. On the other hand, other known tungstates with different stoichiometry offer the option of adjusting the concentration of the silver in the product electrode material. In addition, the silver content in the product may also be controlled by varying the ratio of the starting products, i.e., tungstate and tungsten carbide. If the amount of tungsten (on an elemental basis) in the metatungstate and in the tungsten carbide in the suspension are equal, the finished electrode material has a silver content of about 10% by weight.

Silver nitrate is preferably employed as the silver salt, but other soluble silver salts may also be employed, for instance, silver acetate or silver fluoride. The silver salt is preferably in the form of an aqueous solution, because with such a solution, the precipitation of silver tungstate can be readily controlled.

The electrode material prepared in accordance with the invention, which contains silver and tungsten carbide, exhibits a uniformly high electrochemical activity, and the reproducibility of the method is therefore established. In addition, the catalytic activity is increased over that of the electrode material prepared according to the above-described method; this can be observed, for instance, from the current-voltage characteristics of the electrode materials. Furthermore, the silver content in the end product may be reduced, compared to the product of the above described method, which is important for reasons of economy. Finally, through the use of tungsten carbide as the starting material, it is also possible to conduct an intermediate check regarding the electrochemical activity of the product electrode material by determining the activity of the tungsten carbide so used.

The invention will be explained in further detail with reference to an example of an embodiment and FIG. 1, which figure illustrates current-voltage characteristics of electrodes containing electrode material prepared in accordance with the invention.

Tungsten carbide is prepared as follows: 250 g of tungstic acid ($H_2WO_4$) in powder form are reduced in a quartz tube furnace in hydrogen flowing at approximately 100 liters/hour. The reduction takes place first at 540°C for 3 hours and subsequently at about 700°C for 2 hours. After the reduction is complete, the temperature is raised to about 860°C and the hydrogen is replaced by carbon monoxide flowing at about 200 liters/hour. The carburation is complete after about 4 hours. One obtains about 190 g of tungsten carbide with a mean grain size of less than 1 micron. In order to avoid oxidation (the tungsten carbide can be present as a pyrophorous powder), the material, which is cooled under a carbon monoxide atmosphere, can be suspended immediately in water. The tungsten carbide prepared in this manner is fabricated into a so-called supported electrode having a coating thickness of 20mg/cm$^2$. In a standard half-cell operated at room temperature (about 22°C) with a hydrogen pressure of 30 N/cm$^2$, a 2.5 m $H_2SO_4$ electrolyte and a polarization of 200 mV, the current yield is 0.25 A/gram of electrode material and the current density is 5 mA/cm$^2$.

A solution of sodium metatungstate is prepared in the following manner. 250 g of sodium tungstate ($Na_2WO_4 \cdot 2 H_2O$) are dissolved in 2.5 liters of water and 700 g of tungstic acid ($H_2WO_4$) are added to this solution, which is subsequently heated and maintained for 2 to 3 hours at its boiling point. After the residue, which consists essentially of unreacted tungstic acid, has settled the remaining clear solution of sodium metatungstate, is decanted; additional sodium metatungstate solution is obtained by centrifuging the residue and combined with the decanted solution. The combined solutions are reduced to about 20% of their volume in a sand bath at temperatures up to about 250°C, thereby producing an approximately 1.2 molar sodium tungstate solution.

Electrode material containing silver and tungsten carbide is prepared as follows. 500 g of finely divided tungsten carbide (or an aqueous suspension with the corresponding content of tungsten carbide) are added to 540 ml of an approximately 1.2 molar solution of sodium metatungstate ($Na_2O \cdot 4 WO_3$). The suspension thereby obtained, while being stirred vigorously, is reacted dropwise with a solution of 434 g of silver nitrate in 300 ml of water at a temperature of about 80°C. A mixture of about 1100 g (after filtering and drying) tungsten carbide and silver metatungstate precipitates in the form of a dark gray precipitate.

150 g of such dried mixture of tungsten carbide and silver metatungstate (gross composition: $Ag_2O \cdot 4 WO_3 + 4 WC$) are placed in a quartz tube and reduced in a tube furnace in a hydrogen stream flowing at the rate of about 100 liters/hour for 2 hours at a furnace temperature of about 540°C. After the reduction of the silver metatungstate to metallic silver and tungsten is complete, the temperature of the furnace is raised to about 840°C and the hydrogen replaced with carbon monoxide flowing at the rate of about 100 liters/hour. The carburizing of the metallic tungsten is complete after about 50 minutes. About 107 g of electrode material (Ag-WC) with a grain size in the range between 10 and 80 microns is produced.

The electrode material prepared in this manner is fabricated into a supported electrode having an electrode area of 12.5cm$^2$. To this end, sufficient electrode material is deposited on a layer of asbestos paper, which may contain a binder, to furnish a coating of about 200 mg/cm$^2$. The coating of electrode material is covered on the gas side with a carbon fabric which supports the coating and serves to make electrical contact. On the electrolyte side, the asbestos layer is supported by a perforated tantalum sheet.

The catalytic activity of such an electrode was tested in a half-cell arrangement, a gold sheet serving as the counterelectrode. An electrolyte of 2.5 m $H_2SO_4$ was used as the electrolyte liquid; hydrogen at 20 N/cm$^2$ served as the reaction gas. An Hg/Hg$_2$SO$_4$ electrode in the same electrolyte was used as the reference electrode.

The results obtained in the investigations are depicted in FIG. 1 as current-voltage characteristics, current density in mA/cm$^2$ versus the polarization ($\eta$) in mV, measured against the Hg/Hg$_2$SO$_4$ reference electrode. The characteristics were obtained on electrodes with a coating thickness of 200 mg/cm$^2$. The data for curve 11 was obtained at an electrolyte temperature of 22°C; the data for curves 12 and 13 at electrolyte temperatures of 50°C and 70°C, respectively.

As may be seen from curve 11, a current density of about 21 mA/cm$^2$ is obtained with the electrode material prepared in accordance with the invention, with a coating of 200 mg/cm$^2$, an operating pressure of 20 N/cm$^2$, an electrolyte temperature of 22°C and with a polarization of 200 mV; from this, the calculated current yield is about 0.1 ampere per gram of catalytically active electrode material. Referred to the tungsten carbide content alone (the material contains about 10 weight % silver), the current yield is about 0.12 ampere/gram. An important advantage of the electrode material prepared in accordance with the invention, as compared to pure tungsten carbide, is that electrodes made with it are operable at a hydrogen pressure of 12 N/cm$^2$, and attain their optimum performance characteristic at about 20 N/cm$^2$; with pure tungsten carbide, an operating pressure of about 30 N/cm$^2$ is required.

The attainable current density increases with increasing electrolyte temperature. With a polarization of 200 mV, the current density is about 55 mA/cm$^2$ (curve 12) at an electrolyte temperature of 50°C and at an electrolyte temperature of 70°C, the current density attainable with the same polarization is about 115 mA/cm$^2$ (curve 13).

In addition to fuel cells and storage cells, the electrode material prepared in accordance with the invention may also be employed in other electrochemical cells, particularly for electro-synthesis and electrolysis. If used in storage cells, the electro-catalyst prepared in accordance with the invention is particularly useful as the electrode material in the indicator and consumable electrodes in gastight storage cells, because in such cells provision must be made for preventing the gases which may be generated due to overcharging, and are generated during discharging, from exerting an excessively high pressure. In order to achieve this, the capacity of the positive electrode is, for instance, selected to be larger than that of the negative electrode, so that in case of overcharging, hydrogen develops first at the negative electrode (2 H$_2$O + 2 e$^-$ → H$_2$ + 2 OH$^-$). In principle, two means of prevention are known. First, a so-called consumable electrode may be incorporated into the storage cell, at which the hydrogen which may be generated is electrochemically reacted and is brought into solution again. Secondly, the storage cell may comprise a so-called indicator electrode which is catalytically active and sets up the reversible hydrogen potential under the action of hydrogen. This potential, which is measured against a reference electrode, may then be used as a control signal to terminate the charging process. The electrode material prepared in accordance with the invention can be used for both kinds of the auxiliary electrodes mentioned, i.e., the consumable electrodes and the indicator electrodes.

Having thus described the invention, what is claimed is:

1. A process for preparing silver containing tungsten carbide particles adapted for use in manufacturing electrodes for fuel cells, which process comprises forming a suspension of finely-divided particles of tungsten carbide in an aqueous solution of a tungstate, adding to said suspension a solution of a silver salt, thereby forming a mixture of a precipitate of silver tungstate, and tungsten carbide particles, separating said mixture from said suspension, reducing the silver tungstate in said mixture to metallic silver and tungsten, and carburizing said metallic tungsten to tungsten carbide, to obtain particles of silver containing tungsten carbide.

2. A process according to claim 1, wherein said tungstate solution comprises an alkali tungstate.

3. A process according to claim 1, whereby the weight amount of tungsten in said tungsten carbide and in said tungstate solution are approximately the same.

4. A process according to claim 1, wherein said tungstate is a metatungstate.

5. A process according to claim 1, wherein said reduction of said silver tungstate is with hydrogen at a temperature in the range of between about 400° and about 600°C.

6. A process according to claim 1, wherein said carburizing is with carbon monoxide or methane at a temperature range between about 800° and about 1000°C.

7. A process according to claim 6, wherein carburation is carried out with carbon monoxide at a temperature in the range of between about 820° and 840°C.

8. A process according to claim 1, wherein said tungsten carbide in said suspension has a mean grain size of less than 1 micron.

* * * * *